United States Patent
Rich et al.

(10) Patent No.: US 9,590,967 B2
(45) Date of Patent: Mar. 7, 2017

(54) APPLICATION AUTHENTICATION POLICY FOR A PLURALITY OF COMPUTING DEVICES

(75) Inventors: Stephen E. Rich, Portland, OR (US); Gyan Prakash, Beaverton, OR (US); James R. Bodio, Tigard, OR (US); Selim Aissi, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 228 days.

(21) Appl. No.: 13/995,972

(22) PCT Filed: Sep. 30, 2011

(86) PCT No.: PCT/US2011/054139
§ 371 (c)(1),
(2), (4) Date: Aug. 30, 2013

(87) PCT Pub. No.: WO2013/048426
PCT Pub. Date: Apr. 4, 2013

(65) Prior Publication Data
US 2013/0340034 A1    Dec. 19, 2013

(51) Int. Cl.
*G06F 7/04* (2006.01)
*H04L 29/06* (2006.01)
(Continued)

(52) U.S. Cl.
CPC ............ *H04L 63/08* (2013.01); *G06F 21/305* (2013.01); *G06F 21/74* (2013.01);
(Continued)

(58) Field of Classification Search
CPC ............................. G06F 21/604; G06F 21/606
(Continued)

(56) References Cited

U.S. PATENT DOCUMENTS

| | | | |
|---|---|---|---|
| 2003/0154380 A1* | 8/2003 | Richmond | .......... H04L 63/0218 713/182 |
| 2007/0111726 A1 | 5/2007 | Lambert et al. | |

(Continued)

FOREIGN PATENT DOCUMENTS

| | | |
|---|---|---|
| CN | 101908976 | 12/2010 |
| JP | 2003067652 | 3/2003 |

(Continued)

OTHER PUBLICATIONS

Weinreich et al., "Enhancing presentation level integration of remote applications and services in Web portals," 2005 IEEE International Conference on Services Computing (SCC'05) vol. 1 Year: 2005, vol. 2 pp. 224-231.*

(Continued)

*Primary Examiner* — Roderick Tolentino
(74) *Attorney, Agent, or Firm* — Trop, Pruner & Hu, P.C.

(57) ABSTRACT

A method, system, and computer accessible medium are disclosed for launching an application authentication policy (AAP) application on a computing device, enabling the device for use as a personal device of a user if the user is authenticated by the AAP application, and otherwise enabling the device for use as a non-personal device that provides only basic functionality but protects other users' personal data and applications.

14 Claims, 8 Drawing Sheets

100

(51) Int. Cl.
  *G06F 21/74* (2013.01)
  *H04N 21/475* (2011.01)
  *H04N 21/45* (2011.01)
  *H04N 21/4627* (2011.01)
  *H04N 21/81* (2011.01)
  *G06F 21/30* (2013.01)
  *G06F 9/445* (2006.01)

(52) U.S. Cl.
  CPC ..... *H04N 21/4532* (2013.01); *H04N 21/4627* (2013.01); *H04N 21/4755* (2013.01); *H04N 21/8166* (2013.01); *G06F 9/44505* (2013.01); *G06F 2221/2143* (2013.01); *G06F 2221/2149* (2013.01); *H04L 63/102* (2013.01)

(58) Field of Classification Search
  USPC ..................................................... 726/26–31
  See application file for complete search history.

(56) References Cited

U.S. PATENT DOCUMENTS

| | | | |
|---|---|---|---|
| 2007/0204037 A1* | 8/2007 | Kunz | G06Q 30/02 709/225 |
| 2008/0034217 A1* | 2/2008 | McQuaide | H04B 1/202 713/186 |
| 2009/0083847 A1 | 3/2009 | Fadell et al. | |
| 2009/0271503 A1* | 10/2009 | Pearce | H04M 3/42178 709/220 |
| 2009/0282473 A1 | 11/2009 | Karlson et al. | |
| 2010/0205541 A1* | 8/2010 | Rapaport | G06Q 10/10 715/753 |
| 2010/0210240 A1 | 8/2010 | Mahaffey et al. | |
| 2010/0275263 A1* | 10/2010 | Bennett | G06F 21/577 726/25 |
| 2011/0218965 A1 | 9/2011 | Lee et al. | |
| 2011/0228763 A1* | 9/2011 | Magnus | H04M 1/72561 370/352 |
| 2011/0302630 A1* | 12/2011 | Nair | G06F 21/41 726/4 |
| 2012/0023157 A1* | 1/2012 | Roth | H04L 67/306 709/203 |
| 2012/0036552 A1* | 2/2012 | Dare | H04L 41/0253 726/1 |

FOREIGN PATENT DOCUMENTS

| | | |
|---|---|---|
| JP | 2007259307 | 10/2007 |
| JP | 2010-257060 | 11/2010 |
| JP | 2010534871 | 11/2010 |
| KR | 10-2004-093753 | 11/2004 |
| KR | 10-2005-092532 | 9/2005 |
| KR | 10-2010-119325 | 11/2010 |

OTHER PUBLICATIONS

Kumar, K.R.R., "Service Roaming over Mobile Networks: A Reality Check," 2007 IEEE International Conference on Communications Year: 2007 pp. 2058-2063.*

International Searching Authority, "Notification of Transmittal of the International Search Report and the Written Opinion of the International Searching Authority," mailed May 15, 2012, in International application No. PCT/US2011/054139.

Japanese Patent Office, Office Action mailed Aug. 4, 2015, in Japanese Patent Application No. 2014-533262.

Korean Patent Office, Korean Office Action mailed on Aug. 31, 2015 in Korean Patent Application No. 10-2014-7008442. (Redacted).

European Patent Office, Supplemental European Search Report mailed Oct. 8, 2015, in European Patent Application No. 11873296.5.

Korea Intellectual Property Office, Notice of Final Rejection mailed Apr. 8, 2016 in Korean Application No. 10-2014-7008442. (Translation Redacted).

State Intellectual Property Office of the People's Republic of China, Office Action mailed Nov. 16, 2015 in Chinese Patent Application No. 201180073802.X.

Korea Intellectual Property Office, Notice of Amendment Dismissal mailed May 23, 2016 in Korean Patent Application No. 10-2014-7008442.

Korea Intellectual Property Office, Notice of Second Final Rejection mailed May 31, 2016 in Korean Patent Application No. 10-2014-7008442.

State Intellectual Property Office of The People's Republic of China, Second Office Action mailed Aug. 5, 2016, in Chinese Patent Application No. 201180073802.X.

Korea Intellectual Property Office, Notice of Preliminary Rejection mailed Dec. 13, 2016 in Korean Application No. 10-2016-7017593.

* cited by examiner

APPLICATION AUTHENTICATION POLICY FOR A PLURALITY OF COMPUTING DEVICES

BACKGROUND

Computing systems are undergoing an evolution, as users increase the types of devices they use for computing, communications, media delivery and so forth. Rather than being tied to desktop personal computers (PCs), users in ever increasing numbers are turning to additional device types and form factors such as tablet computers, smartphones and multi-screen television (TV), which is a term used for live media broadcast and on-demand content delivered to a connected consumer device. These devices are being adopted by many as major computing/consumption devices, and they are not limited to conventional usage such as a phone being limited for voice call and short messaging service (SMS) and a TV being limited for live/on-demand content viewing.

Instead, these computing devices are now connected to the Internet, and various family members can use such devices for social networking, web browsing, making phone calls, video-on-demand (VOD) services from the Internet, as well as other usages that were limited only to PC clients just a few years ago. However, there are challenges in providing security and a common user experience across these disparate devices.

DETAILED DESCRIPTION

In various embodiments, an application authentication policy (AAP) can be provided to users of varied computing devices including smartphones, tablet computers, netbooks, mobile Internet devices, multi-screen TVs and so forth. In this way, these devices can identify users and maintain selected profiles, user settings and access privilege levels, such as parenting controls, etc. In addition to providing an application authentication profile similar to a multi-user mode, seamless user profile management and configurations can be provided on other connected devices that a user might use, based on a secure authentication mechanism. By providing this policy, application profile customization can be provided per user and may be protected by an authentication mechanism such that any other user using a given device subject to the policy cannot access a previous user's profile/personal data.

Note further that a given device can operate without user authentication, and any new user of the device can use basic functionality, and potentially install applications, depending on a configuration of the device. In embodiments with a cloud-based mechanism, a user profile on multiple devices can be accessed via a single device, and the profile further can be managed via this device, e.g., including an operation to remotely delete one or more such profiles.

In one embodiment, an application authentication policy includes a user authentication for one or more selected user applications as a single sign-on. Once authenticated, a user can freely use all applications associated with that user in a personal device mode. In addition, some embodiments may provide for cloud storage of the application authentication policy so that a user profile can be replicated on other devices on-the-go. Still further, a portable device or dongle such as a universal serial bus (USB) thumb drive or other mechanism can be used to provide this policy.

Embodiments may be used to configure a device with a given amount of functionality regardless of whether a user has been authenticated according to an authentication policy. For example, a basic level of functionality of the device can be made available to all users in a family. With reference to a tablet computer, smartphone, TV, or other Internet-connected device, these functions may include selected Internet site browsing, selected TV channel viewing, making selected area phone calls, playing selected games, and so forth.

Instead, any policy-based personal applications are available only to an authenticated user on that device. Although the scope of the present invention is not limited in this regard, such applications may include social networking, electronic-commerce (e-commerce) usages using in-application purchases or use of a marketplace stored credit card, electronic mail (e-mail)/chat applications, and so forth. Such policy-based applications may further include an administrative/policy setting privilege for TV channels, VOD, personal applications and games, and so forth. This can also be extended to a smartphone and other connected device as desired to allow basic device capability and enhanced capabilities such as multiscreen TV, or premium media experiences only when a given user has been securely authenticated on the device.

Figure 1:
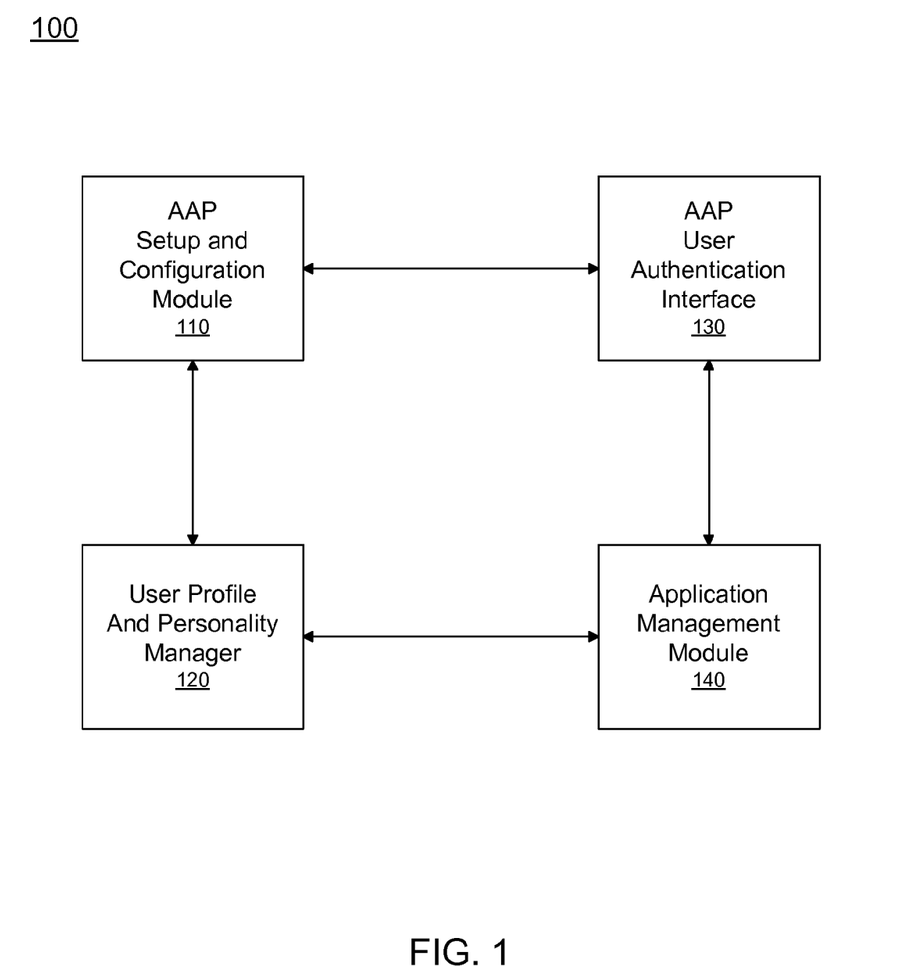
FIG. 1 is a block diagram of various modules of an application authentication policy arrangement in accordance with an embodiment of the present invention.

According to one embodiment, an authentication policy may be enabled and thereafter accessed by a combination of an AAP setup and configuration module (ASCM), user profile and personality manager (UPPM), AAP user authentication interface (AUAI), and an application management module (AMM). Referring now to FIG. 1, shown is a block diagram of various modules of an application authentication policy arrangement in accordance with an embodiment of the present invention. As shown in FIG. 1, arrangement 100 can be implemented as a non-transitory computer readable storage medium that includes instructions to perform authentication operations in accordance with an embodiment of the present invention. Although implemented in one embodiment as such a medium, understand the scope of the present invention is not limited in this regard and in other implementations, arrangement 100 can be implemented as hard coded logic, different modules of a hardware processor, or so forth. Furthermore, understand that while a master version of this arrangement can be stored in a master location, which can be accessible to various end users, e.g., via the Internet, copies of at least portions of this arrangement can be stored on various devices, both personal to a user, as well as public devices to enable users to access their own personal user profile from such a public device.

As seen, arrangement 100 includes an AAP setup and configuration module (ASCM) 110. As will be described further below, module 110 may be used to generate a user profile and furthermore to update the profile and to configure various policies for the device overall when active in an administrator account.

In one embodiment, ASCM 110 can be made available as an application. Once installed on a device, a given user first can be authenticated and when authenticated be allowed to create a user profile to an administrator account. This administrator account may be a primary account that is responsible for activating the device and setting up user policies. The default ASCM setup allows any user to use the basic device functionality such as use of a tablet to computer browse the Internet, use of voice over Internet protocol (VoIP), allow the user to use a TV for basic television channels such as rated G/PG-13, etc.

Any user can use ASCM 110 to activate/create a user profile. If a user does not do so, the device can continue to work as usual per the default ASCM basic device functionality. However, any users' profiles/applications will be protected based on the corresponding policy and not accessible to this non-authenticated user. Embodiments may thus provide a single sign-on that when authenticated enables a user to access all applications associated with that user in a personal mode. Furthermore, using the ASCM, a user can configure one or more applications to be personal to that user such that these applications, although stored on the computing device, can remain hidden to a different user. Or, the user can configure such applications to be available to other users (although the personal data of the user for that application remains hidden).

Furthermore, using ASCM 110, a user can download an application and configure it personal to that user such that no other user can access the application. Or, for an application already stored on a device, the user can update the application's profile to make it personal to that user.

In some instances, applications can be virtualized. That is, permissions may be set up to allow multiple users to access a single application stored once on a computing platform. However, for each authorized user of the application, only data personal to that user can be displayed when that user has been authenticated. In other configurations where a user does not wish other users to access his or her version of an application, a second user can download a different instance of the same application to be stored on the computing platform and associated as a personal application of that second user.

Still referring to FIG. 1, user profile and personality manager (UPPM) 120 can be used to control management of a user profile, including provisioning of information to the user profile, e.g., in conjunction with ASCM 110, and further to control management operations with regard to storage and access to the user profile either on a local device or on a variety of other devices via remote access to the user profile, which can be stored in a cloud-based storage. Thus, in one embodiment, UPPM 120 allows user profile settings to be backed up to a remote location such as via a cloud-based service. The user profile can include many different types of information, in various embodiments. For purposes of illustration and not limitation, information in a user profile may include user personal e-mail, social networking site information, user credit card information, user phone book/address details, user VOD services such as HuluPlus™, Netflix™, etc., and other user configured personal details. In some embodiments, the UPPM data can be encrypted by a user personal identification number (PIN)/password or some other secure token and stored remotely.

By way of this remote backup/storage via UPPM 120 a user can access his or her user profile settings from a different device than the original device on which the user profile settings were created. Thus via a secure authentication, a user can access a user profile remotely and enable the user profile to be stored on a local device as requested by the user. For example, if a user logs into a TV and is authenticated as an authorized user then he could access his user profile, and may store the user profile in the local device if needed. In some embodiments, via UPPM 120 a user can view the number of devices that has his user profile stored locally and send a remote command to delete a locally stored profile, and wipe it permanently, e.g., using a cloud-based service. Or a user profile can be automatically deleted from at least certain devices after use, e.g., when the device is not a personal device of a user.

Still referring to FIG. 1, an AAP user authentication interface (AUAI) 130 may also be present within the arrangement. This interface can provide a graphical user interface (GUI) to enable a user to interact with the AAP to provide authentication operations, including user names, passwords and so forth. In one embodiment, AUAI 130 can be part of the AAP application and also part of an application profile security engine that executes on a device. The AAP application cannot be uninstalled by the user, but it can be set to a disable mode when no user is using this application on the device. According to one embodiment, AUAI 130 can be initialized and authenticated when a user is to use any of the personalized applications that are identified in the AAP application profile.

Referring still to FIG. 1, arrangement 100 can further include application management module (AMM) 140. In general, module 140 may enable an authenticated user to configure an application as desired for that user, including configuring the appearance of the application on a display, the types of information and so forth to be included in the application, as well as configuring a user's access to the application. In one embodiment, AMM 140 allows a user to configure any application subject to the AAP to be shared by other users. The application can be installed by any of the users and once the application is installed, that user can configure it to be accessed by selected users. Note that a user may instead set the application to personal, in which case the application is not available to other users on the same device. In general, when an application is set to shared, the application is made public but the data associated with launching that application is private and personal such that it is not shared.

Embodiments thus provide a user profile management system that enables multi-user support on non-PC client devices and remote use of a user profile from public devices such as an Internet-connected television in a hotel room, a borrowed/rented temporary smartphone in a different geographic location, etc. Such use cases can be realized by enabling a user profile to be accessed through cloud-based secure authentication. As such there is no need for local configuration of user profiles. Note that although the various modules of FIG. 1 are coupled together as shown, understand that each of the modules can interact directly with the other modules.

Figure 2:
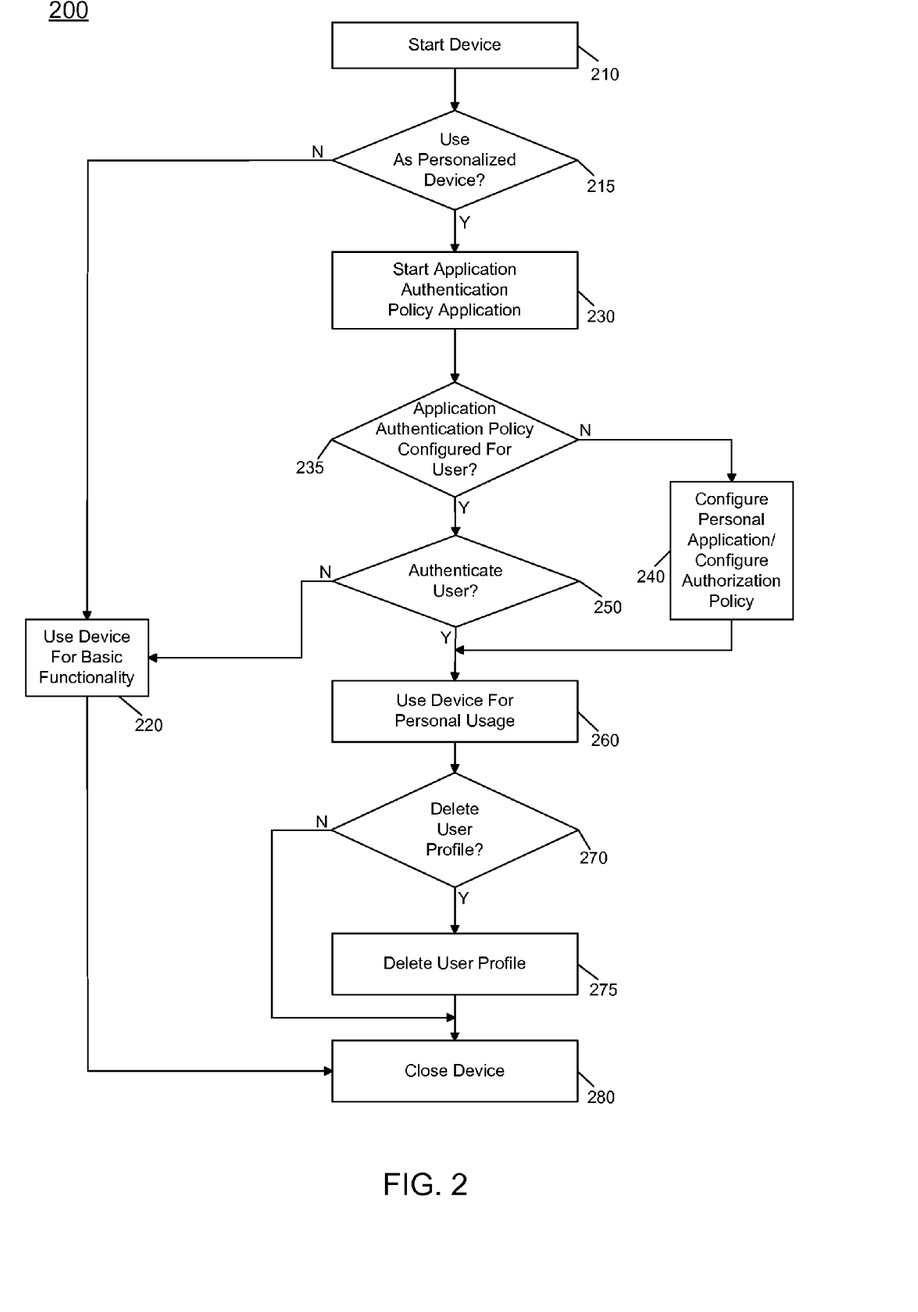
FIG. 2 is a flow diagram of a method in accordance with an embodiment of the present invention.

Referring now to FIG. 2, shown is a flow diagram of a method in accordance with an embodiment of the present invention. As shown in FIG. 2, method 200 may be performed when a user initiates operations on a given device. As described herein, the device can be any type of Internet-connected device, from smartphone, to tablet computer, to connected TV and so forth.

As seen, method 200 may begin by starting the device, e.g., by powering it on (block 210). Next at diamond 215 it can be determined whether a user desires to use the device as a personalized device. As used herein, the terms "personal device" and "personalized device" are used interchangeably and can refer to a computing device that is under a given user's private and permanent control. For example, a smartphone, tablet computer, laptop computer, desktop computer, television or so forth owned by the user and under that user's control can be considered such a personal device. In contrast, publicly available computing devices such as platforms accessible to a user at a public location such as a hotel, restaurant, or other venues, such as shared workplace devices and so forth, are not considered to be personal devices.

Still referring to FIG. 2, although the scope of the present invention is not limited in this regard, in one embodiment this determination at diamond 215 may be based upon the user launching an AAP and using the application to customize the device (or one or more applications executing on the device) for the user. If it is determined that the user does not seek use as a personalized device, control passes to block 220, where the device can be used for its basic functionality. Although the scope of the present invention is not limited in this aspect, such basic functionality can depend upon the given device and may be for web browsing (for at least public web sites) when a device is a tablet or other Internet-connected device, for basic media usage such as basic broadcast or cable TV channels, basic VoIP functionality or so forth.

If instead at diamond 215 it is determined that the user does seek to use the device as a personalized device, control passes to block 230 where the AAP application can be launched. This launching may thus be responsive to user selection of an icon for the AAP application on a graphical user interface (GUI) of the device. Next control passes to diamond 235 where it can be determined whether the AAP application is configured for the user. This determination may be based on access control information. If it is determined that the AAP is not configured for the given user, control passes to block 240, where the AAP can be configured for the user. Thus, the user may configure an authentication policy and corresponding user profile. Upon successful completion of such configuration, control passes to block 260. Note that block 260 may also be reached when a user is authenticated for a configured AAP at diamond 250. If at diamond 250 the user is not authenticated, control passes to block 220, discussed above, for use of basic device functionality.

At block 260, the device may be enabled for usage as a personal device of the user. Although the scope of the present invention is not limited in this regard, this personal usage may include arranging a user interface such as a GUI to conform to configuration information set in a user profile. Furthermore, a variety of applications personal to the user can be displayed on the GUI. In this way, the user can use applications loaded on the device in a personal manner. For example, social networking applications, e-commerce applications, media on demand applications and so forth all can be accessed by the user in a personal manner, such that a user's personal information can be used to perform various actions such as e-commerce transactions, to allow a user to access subscription content services and so forth.

After a user session in which the device is configured for personal device usage, control passes to diamond 270 where it can be determined whether it is desired to delete the user profile from the device. This determination may be based on whether the device is a private device of the user, namely that it is under the user's control, e.g., as the user's own smartphone, tablet computer, TV or so forth, or whether the user is using a publicly accessible device such as a PC or other device of a public facility such as a restaurant, hotel, Internet café or so forth. If the device is public, control passes to block 275 where the profile can be deleted from the device so that other users cannot access the user profile or any other private information of the user. Control then passes to block 280 where the device can be closed.

Figure 3:
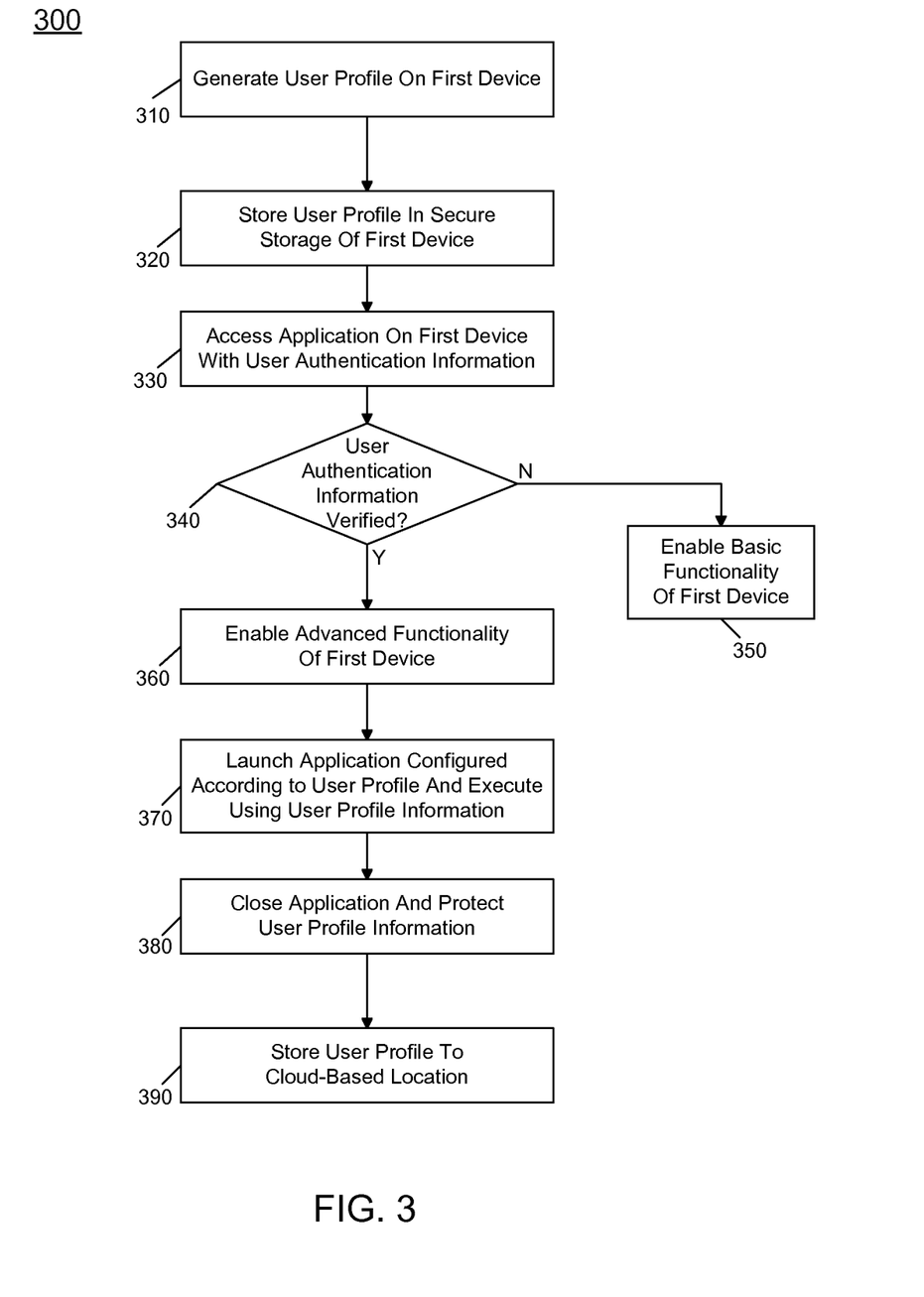
FIG. 3 is a flow diagram of operations in connection with user profile management in accordance with an embodiment of the present invention.

Referring now to FIG. 3, shown is a flow diagram of operations in connection with user profile management in accordance with an embodiment of the present invention. As shown in FIG. 3, method 300 may begin by generating a user profile on a first device (block 310). For example, a user can, via an ASCM and a UPPM of an application authentication policy arrangement, generate a user profile that includes various information including authentication information such as user names, passwords or so forth. Furthermore, from such information various certification information such as hashes, authentication keys, or hash based message authentication codes (HMACs) can be generated and stored in the user profile. In addition, various personal information including credit card information, account information, personal data and so forth can further be stored as part of this user profile.

Next at block 320, this user profile can be stored in a secure storage of the device. Namely, this secure storage can be accessed only within a secure execution mode of the device and can be in a variety of locations in different embodiments. For example, in some embodiments secure hardware can be present that includes a secure storage that can only be accessed in this secure execution mode. In other embodiments, for example, where such a secure hardware device is lacking, the user profile can be stored in a given non-volatile storage such as a mass storage device, e.g., a hard drive, solid state storage such as a flash storage or other device. Because such devices can be accessed in a non-secure environment, this user profile information can be stored in an encrypted form.

Referring still to FIG. 3, after generation of such a user profile, normal operations can be performed. Accordingly, at block 330 an application can be accessed using the user authentication information. At diamond 340 it can be determined whether the user authentication information is verified. Although the scope of the present invention is not limited in this regard, in some embodiments the verification process may seek user authentication information such as a user name and password combination and generate a hash therefrom. This generated hash can then be compared to a stored hash that is associated with the user with regard to the particular application being sought to be accessed (e.g., stored in application data stored in a secure location). If the hash values match, the user is thus authenticated and accordingly, control passes to block 360 where advanced functionality of the first device can be enabled. More specifically, this application that is subject to the authentication protocol can be launched. As seen at block 370, the application can be configured according to user profile information for the user and thus the user may execute operations in the application using the user profile information. For example, in connection with banking or other financial transactions, secure financial information from the user profile can be accessed and used to perform transactions. Instead for a social networking application such as Facebook™, personal data of the user can be loaded to provide the user's desired view.

Referring still to FIG. 3, if instead the user authentication information is not verified for the application to be accessed, control passes to block 350, where basic functionality of the device can be enabled.

Still referring to FIG. 3, control passes from block 370 to block 380 where the application can be closed when the user has completed desired processing and accordingly, the user profile information can be protected. For example, any user profile information that has been accessed and used can be cleared from any volatile storages of the device. Furthermore, any changes to the user profile or application personal data can be stored back to the appropriate secure storage. Accordingly, method 300 continues to block 390. At block 390, the user profile that has been generated can be stored to a cloud-based location. Note that this operation can be optional. Thus in circumstances where a user may desire to access user profile information on a different device, a generated user profile can be uploaded to a cloud-based location such as a storage device in a data center or other location. In various embodiments, this communication of user profile information can be performed securely. Furthermore, in some embodiments this cloud-based location may act as the central point for maintaining coherency of a user profile across various devices. Thus on an initial generation of the user profile, it can be stored to this cloud-based location. Then when any updates occur on a given device, such updates can be communicated to the cloud-based location for storage in this central location. Note that in certain implementations, when the central user profile has been updated, an update notification can be provided to various devices on which a user profile is stored. However, the actual provision of the user profile update to such devices does not occur unless an update request is received from the device. Although shown with this particular implementation in the embodiment of FIG. 3, understand the scope of the present invention is not limited in this regard.

Figure 4:
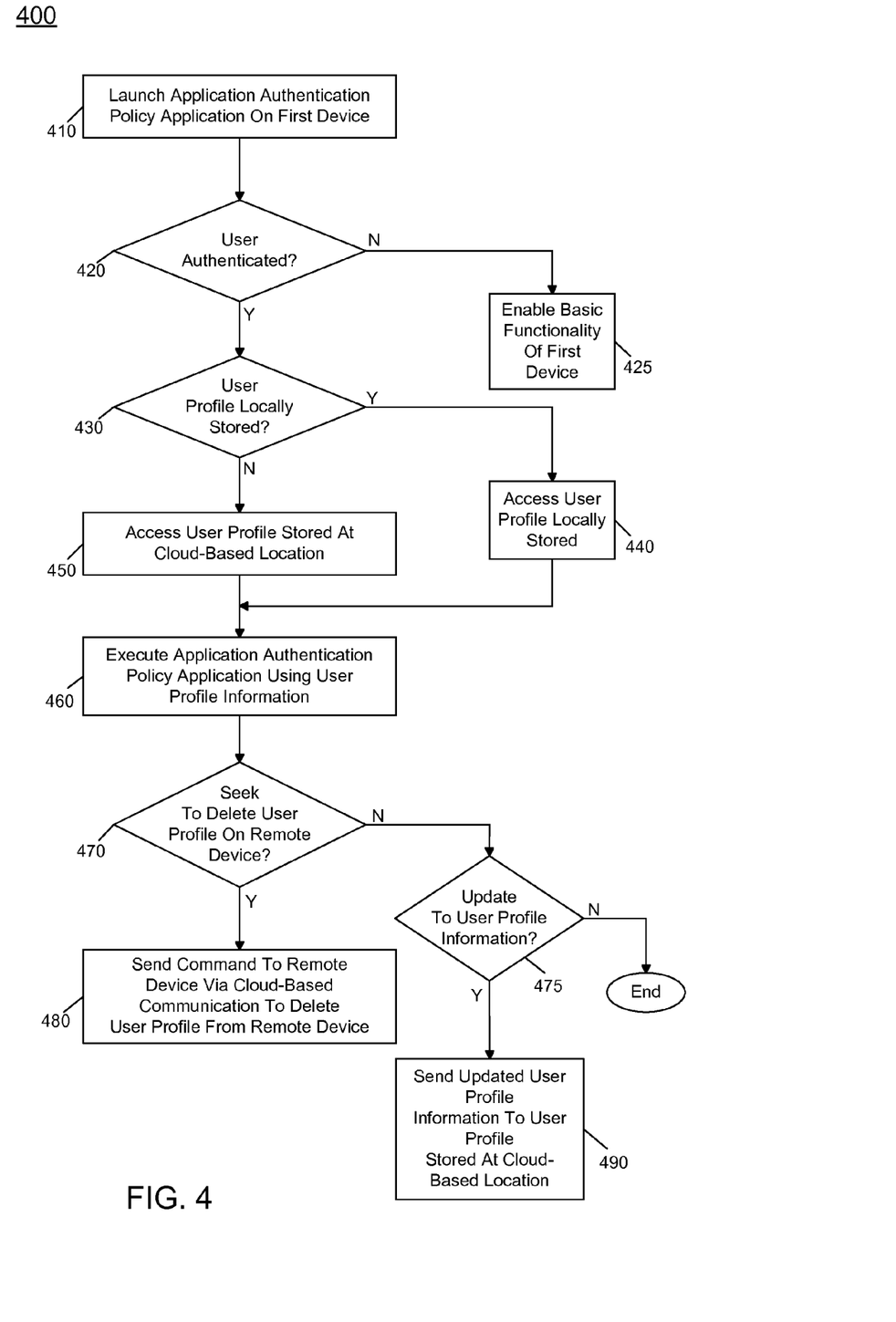
FIG. 4 is a flow diagram of a method for performing additional authentication operations in accordance with an embodiment of the present invention.

Referring now to FIG. 4, shown is a flow diagram of a method for performing additional authentication operations in accordance with an embodiment of the present invention. As shown in FIG. 4, method 400 may be performed using various modules of an application authentication policy application. Such operations can be used to access an application that is subject to an authentication policy and furthermore to control management of remote user profiles. As seen, method 400 may begin by launching an application authorization policy application on a first device (block 410). This launching may occur by selecting an icon for the authentication policy application on a display of the device. This launching may cause the application to seek user authentication at diamond 420, where it can be determined whether the user is authenticated. As discussed above, a user can input a user name and password and/or other authentication information that an AUAI can use to generate a hash to be compared to a stored hash. If the user is not authenticated, control passes to block 425 where basic functionality of the device can be enabled. However, the user is not allowed to access certain applications or perform advanced functionality.

Still referring to FIG. 4 if instead the user is authenticated, control passes to diamond 430 where it can be determined whether a user profile for this user is locally stored. This determination can be made by comparing at least some of the user authentication information to a list of user profiles that are locally stored. If the user profile is not locally stored, control passes to block 450 where the user profile can be accessed from a cloud-based location. As discussed above in some embodiments the communication of this cloud-based user profile can be by secure communication. This user profile can be locally stored, e.g., in a temporary storage within the secure execution environment when downloaded to the device.

Otherwise if the user profile is locally stored, it can be accessed from its local storage (block 440). As further seen in FIG. 4, control passes from both blocks 440 and 450 to block 460 where the application authentication policy application can be executed using this user profile information. For example, access to certain applications can be made subject to this policy, or the user may perform configuration activities, updating of the user profile or so forth in this secure execution environment.

Yet another example of an activity that can be performed can be remote user profile management, e.g., using a UPPM of the AAP application. Thus as seen in FIG. 4, at diamond 470 it can be determined whether a user seeks to delete a user profile on a remote device. If so, control passes to block 480 where a command can be sent to the remote device via a cloud-based communication to cause this user profile to be deleted. For example, assume that a user accessed a user profile on a public device such as available at a hotel, airport or other public location and in fact caused the user profile to be downloaded to that device. And furthermore assume that the user forgot to remove the profile prior to terminating use of device. Accordingly, by this cloud-based communication, the user can send a command to cause that remote user profile to be deleted. Similar operations can occur for remote deletion of the user profile in other instances.

Further by the cloud-based communication, a user can visualize a user profile on a remote device. For example, assume that the user has multiple devices including smartphone, tablet computer, connected television and so forth. By enabling visualization in accordance with an embodiment of the present invention, a user at a single location can visualize the user profiles present on these different devices.

Still referring to FIG. 4, additional use scenarios are contemplated. For example, as further seen in FIG. 4 user profile updates can be accommodated. Specifically, at diamond 475 it can be determined whether a request has been received to update user profile information. If so, the user profile can be updated on the first device. Furthermore, to maintain coherency of the user profile across various compute platforms, the updated user profile can be sent to update the user profile stored at the cloud-based location (block 490). In this way, the cloud-based storage of the user profile can remain the central point for coherency such that when the user seeks to access a user profile at a remote device, an indication of an update availability can be provided so that the user can access the updated user profile information from the cloud-based storage. Although shown with this particular implementation in the embodiment of FIG. 4, understand the scope of the present invention is not limited in this regard.

Figure 5:
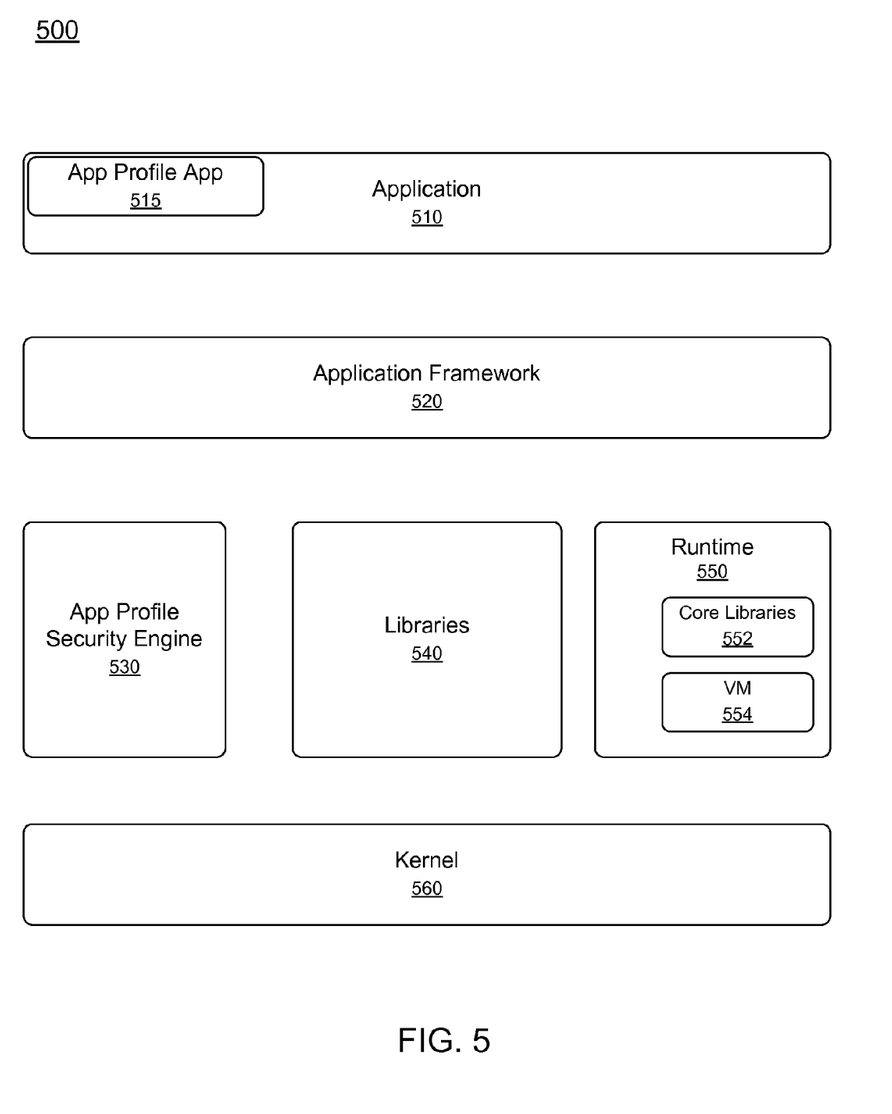
FIG. 5 is a block diagram of a software architecture for a smartphone platform in accordance with one embodiment of the present invention.

Embodiments can be implemented in many different systems. For purposes of illustration, an architecture of an AAP application within the context of a smartphone, namely an Android™-based smartphone is shown in FIG. 5. As seen, FIG. 5 shows a block diagram of a software architecture 500 for an Android™-based platform. As seen, architecture 500 includes an application layer 510 in which various user applications can execute. One such application may be an AAP application 515 in accordance with an embodiment of the present invention. Various other user applications, ranging from communications applications, computing applications, e-mail applications and so forth, may further reside in application layer 510.

An application framework 520 executes below application layer 510. Application framework 520 may include various managers to manage functionality of the smartphone. In turn, various services, agents, native libraries and a runtime can execute below application framework 520. In the embodiment shown in FIG. 5, such components may include an application profile security engine 530 on which at least portions of an AAP can execute. In addition, various native libraries 540 may be present to handle different services. In addition, a runtime 550 can include core libraries 552 and a process virtual machine 554 such as a Dalvik VM. As further seen in FIG. 5, all of the above components can execute on a kernel 560, namely a Linux™ kernel. Such kernel can include various drivers for hardware interaction, networking interaction and so forth.

Figure 6:
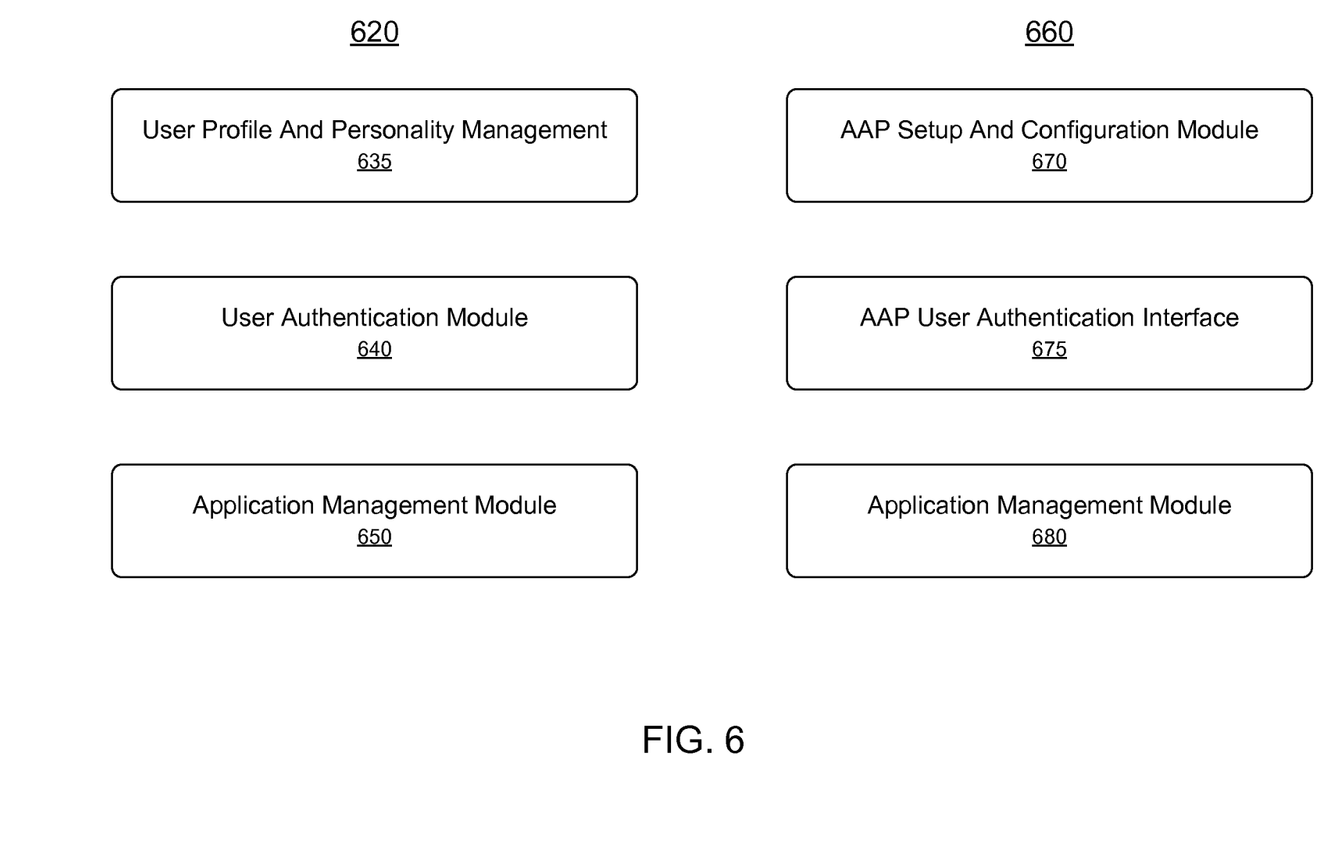
FIG. 6 is a stack diagram of a security engine stack and an application stack in accordance with one embodiment of the present invention.

As a further illustration of the arrangement of the AAP application and the security engine, reference can be made to FIG. 6. As seen, FIG. 6 provides a stack diagram of a security engine stack 620 and an AAP application stack 660. As seen, security engine stack 620 can include a UPPM 635, a user authentication module 640, and an AMM 650. In turn, AAP application stack 660 can include an ASCM 670, and a AUAI 675 and an AMM 680. As seen in some embodiments a mix of the different modules of an application authentication profile application can be implemented between a security engine and the AAP application itself.

Figure 7:
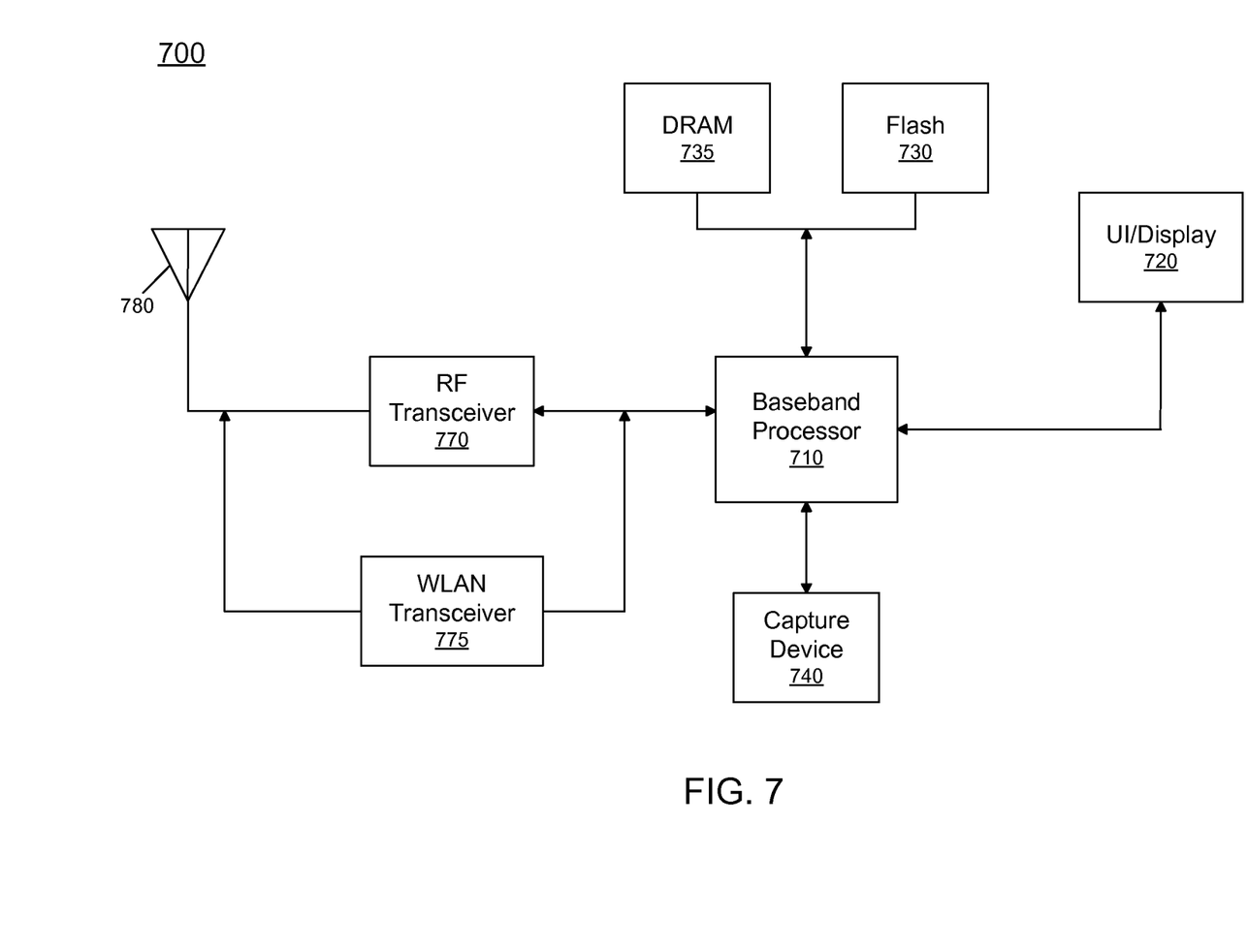
FIG. 7 is a block diagram of an example system in accordance with one embodiment of the present invention.

Embodiments thus can be used in many different environments. Referring now to FIG. 7, shown is a block diagram of an example system 700 with which embodiments can be used. As seen, system 700 may be a smartphone or other wireless communicator. As shown in the block diagram of FIG. 7, system 700 may include a baseband processor 710 on which an AAP application can execute. In general, baseband processor 710 can perform various signal processing with regard to communications, as well as perform computing operations for the device. In turn, baseband processor 710 can couple to a user interface/display 720 which can be realized, in some embodiments by a touch screen display. In addition, baseband processor 710 may couple to a memory system including, in the embodiment of FIG. 7 a non-volatile memory, namely a flash memory 730 and a system memory, namely a dynamic random access memory (DRAM) 735. As further seen, baseband processor 710 can further couple to a capture device 740 such as an image capture device that can record video and/or still images.

To enable communications to be transmitted and received, various circuitry may be coupled between baseband processor 710 and an antenna 780. Specifically, a radio frequency (RF) transceiver 770 and a wireless local area network (WLAN) transceiver 775 may be present. In general, RF transceiver 770 may be used to receive and transmit wireless data and calls according to a given wireless communication protocol such as third generation (3G) or fourth generation (4G) wireless communication protocol such as in accordance with a code division multiple access (CDMA), global system for mobile communication (GSM), long term evolution (LTE) or other protocol. Other wireless communications such as receipt or transmission of radio signals, e.g., AM/FM, or global positioning satellite (GPS) signals may also be provided. In addition, via WLAN transceiver 775, local wireless signals, such as according to a Bluetooth™ standard or an Institute of Electrical and Electronics Engineers (IEEE) 802.11 standard such as IEEE 802.11a/b/g/n can also be realized. Although shown at this high level in the embodiment of FIG. 7, understand the scope of the present invention is not limited in this regard.

Figure 8:
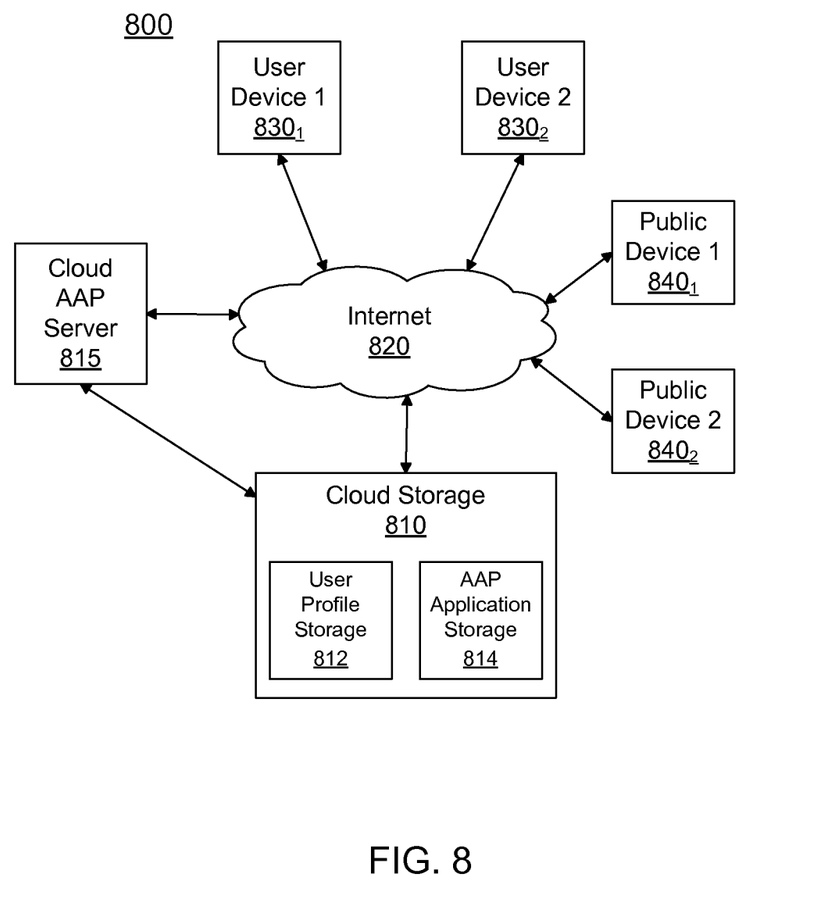
FIG. 8 is a block diagram of a network in accordance with one embodiment of the present invention.

Referring now to FIG. 8, shown is a block diagram of a network in accordance with an embodiment of the present invention. As shown in FIG. 8, network 800 can be used to allow users to access user profiles on a variety of different types of devices and furthermore to enable downloading of an AAP application. As seen, network 800 can correspond to any type of communications network and can include many different types of computing devices interconnected via a given network such as Internet 820.

To enable cloud-based storage of user profiles as well as to provide cloud-based storage of an AAP application, a cloud storage 810 can be provided. This cloud storage can be part of a data center that includes various computing devices, storage devices and so forth. As one example, cloud storage 810 can be a storage device that includes multiple storage components such as disks, optical, or semiconductor-based storage. Cloud storage 810 can act as a repository of master copies of various applications including an AAP application. Specifically in the embodiment of FIG. 8, an AAP application storage 814 can be used to store one or more AAP applications. In addition, cloud storage 810 can provide a user profile storage 812 that can be used to store a master copy of a user profile for various users of the service. These the user profiles can be protected such that only an authorized user can access a given profile, e.g., using a user name and password.

Thus as further seen in FIG. 8, at the same location, e.g., as part of the same data center, a cloud AAP server 815 can be coupled to cloud storage 810. In various embodiments, cloud AAP server 815 can be used to execute various modules of an AAP application to enable a user to remotely access a given user profile, as well as to remotely access other devices to provide user control of that user's user profile on such remote device.

Specifically, as shown in FIG. 8, various user devices can be present, e.g., user devices 830$_1$ and 830$_2$. Such user devices may be personal devices of a given user such as a smartphone, tablet computer, desktop computer or so forth. In addition, other devices such as public computing devices 840$_1$ and 840$_2$ can be present. As discussed above it is possible for a single user's profile to be present on all of these devices, and it is further possible to allow for remote management of these user profiles such that the user, e.g., at a given one of these devices, can control the user profile on the other devices. Such control can include visualizing the user profile, as well as causing a profile to be deleted. In addition, updates to the user's profile present in the cloud storage can be performed from any of these devices, and a notification can be sent to the other computing devices having a copy of the user's profile to indicate the availability of the update. Although shown at this high level in the embodiment of FIG. 8, understand the scope of the present invention is not limited in this regard.

Embodiments may be implemented in code and may be stored on at least one storage medium having stored thereon instructions which can be used to program a system to perform the instructions. The storage medium may be any type of non-transitory storage medium which can include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   launching an application authentication policy (AAP) application on a computing device, the computing device comprising at least one hardware processor and a storage to store one or more applications;
   enabling the computing device for use as a personal device of a user if the user is authenticated by the AAP application, and otherwise enabling the computing device for use as a non-personal device that provides basic functionality, the computing device being a non-personal computer-(PC)-based computing device;
   accessing a remote location comprising a data center having a server and a cloud-based storage using the computing device to obtain a user profile of the user stored in the cloud-based storage comprising a central point for coherency of the user profile, wherein the user profile is accessible via the cloud-based storage to multiple computing devices, at least one of the multiple computing devices being a non-PC-based computing device, wherein the computing device is to access an updated user profile stored in the cloud-based storage responsive to an indication of update availability received in the computing device from the remote location; and
   accessing the remote location using the computing device responsive to a user request to identify a plurality of devices on which the user profile is stored, and interacting with the server of the data center to enable the server to remotely access at least one other device of the plurality of devices to cause the user profile stored on the at least one other device to be deleted, wherein the at least one other device from which the user profile is to be deleted comprises at least one other device remotely located from the computing device and the remote location.

2. The method of claim 1, further comprising determining whether the AAP application is configured for the user, and configuring the AAP application for the user if the user is not configured for the AAP application.

3. The method of claim 1, wherein the personal device usage comprises using a social networking application including personal information of the user obtained from a user profile of the user, the personal information accessible after the user is authenticated for the social networking application.

4. The method of claim 1, wherein the personal device usage comprises performing an electronic commerce transaction using private information of the user obtained from the user profile of the user, the private information accessible after the user is authenticated for the electronic commerce transaction.

5. The method of claim 1, wherein the basic functionality comprises performing web browsing of publicly accessible websites.

6. The method of claim 1, further comprising customizing a first application for execution on the computing device according to the user profile of the user, and customizing the first application for execution on the computing device according to a second user profile of a second user, when the second user has been authenticated by the AAP application.

7. The method of claim 6, further comprising enabling the user to use personal data within the user profile during execution of the first application, and preventing the second user from accessing the personal data within the user profile of the user.

8. At least one non-transitory computer accessible medium including instructions that when executed cause a computing device to:
   authenticate a user on the computing device, via an application authentication profile (AAP) application including a configuration module, a user authentication module, and an application management module, using a security engine of the computing device having a stack including the user authentication module and the application management module of the AAP application;
   responsive to the authentication, enable the user to launch a first application subject to the AAP application and to customize the first application for the user based on a user profile of the user;
   allow a second user to access basic functionality of the computing device when the second user is not authenticated via the AAP application, wherein the second user is prevented from accessing the first application and the user profile of the user, wherein the user profile is obtained from a storage of a cloud-based location comprising at least one server and at least one cloud-based storage and is locally stored in a secure storage of the computing device; and
   access the cloud-based location responsive to a user request to identify at least one computing device on which the user profile is stored to determine whether the user profile is stored on any other computing devices, visualize, via the computing device, the user profile on one or more of the any other computing devices, and send a removal request to the cloud-based location to the at least one server to cause the user profile stored on at least one other computing device to be removed, wherein the at least one other computing device is remotely located from the computing device and is a publicly accessible device.

9. The at least one non-transitory computer accessible medium of claim 8, further comprising instructions to enable, if the second user is authorized via the AAP application, the second user to launch the first application subject to the AAP application and to customize the first application for the second user based on a second user profile of the second user, and to prevent the second user from accessing personal data of the user for the first application.

10. The at least one non-transitory computer accessible medium of claim 8, further comprising instructions that enable the computing device to update the user profile of the user and to send updated information regarding the user profile to the cloud-based location.

11. A system comprising:
   a hardware processor to execute instructions;
   a user interface coupled to the hardware processor, the user interface comprising a touch screen;

a wireless transceiver to transmit and receive information wirelessly, the wireless transceiver comprising a first transceiver to communicate via a wide area wireless network and a second transceiver to communicate via a local area wireless network;

a memory system including a volatile memory and a non-volatile storage medium including instructions that enable the system to allow a user to execute at least one application using personal data of a user profile of the user maintained in a first secure storage of the system responsive to authentication of the user by an application authentication profile (AAP) application, communicate the user profile to a cloud-based location of a data center for secure storage of the user profile at the cloud-based location in a second secure storage, wherein the second secure storage is to store a master version of a user profile for a plurality of users, the cloud-based location further including a third storage to store a master copy of the AAP application, wherein the instructions further enable the system to update the user profile via the AAP application and communicate the update to the user profile to the cloud-based location to maintain the user profile stored at the cloud-based location coherent with the user profile stored in the first secure storage of the system, and if the user is not authenticated by the AAP application, enable the system for basic functionality in which the user is not permitted to execute the at least one application and the user is not permitted to access any user profile, and access the cloud-based location responsive to a user request to identify at least one computing device on which the user profile is stored to determine whether the user profile is stored on any other computing devices, to cause the cloud-based location to remotely access at least one other computing device to cause the user profile stored on the at least one other computing device to be deleted, wherein the at least one other computing device from which the user profile is to be deleted comprises at least one other computing device remotely located from the system and the cloud-based location.

12. The system of claim 11, further comprising instructions to enable the user to delete the user profile from the first secure storage.

13. The system of claim 11, further comprising instructions to enable the user to create the user profile via the AAP application and to store the user profile in the first secure storage.

14. The system of claim 11, further comprising instructions to enable the system to access an updated user profile stored in the cloud-based location responsive to an indication of update availability received in the system from the cloud-based location.

* * * * *